United States Patent [19]

Pellegri et al.

[11] 4,197,178
[45] Apr. 8, 1980

[54] BIPOLAR SEPARATOR FOR ELECTROCHEMICAL CELLS AND METHOD OF PREPARATION THEREOF

[75] Inventors: Alberto Pellegri, Luino, Italy; Placido M. Spaziante, Lugano, Switzerland

[73] Assignee: Oronzio deNora Impianti Elettrochimici S.p.A., Milan, Italy

[21] Appl. No.: 873,509

[22] Filed: Jan. 30, 1978

[30] Foreign Application Priority Data

Feb. 7, 1977 [IT] Italy .................. 20017 A/77

[51] Int. Cl.² .............. C25B 9/00; C25B 13/04; H01M 2/14
[52] U.S. Cl. ................... 204/255; 204/295; 204/290 R; 204/291; 429/210; 429/253
[58] Field of Search .............. 204/295, 296, 254–256, 204/129, 266, 290 R, 291; 429/30, 40, 152, 153, 210, 129, 253

[56] References Cited

U.S. PATENT DOCUMENTS

| | | | |
|---|---|---|---|
| 3,134,697 | 5/1964 | Niedrach | 429/30 |
| 3,702,267 | 11/1972 | Grot | 204/295 X |
| 4,024,036 | 5/1977 | Nakamura et al. | 204/295 X |
| 4,039,409 | 8/1977 | La Conti et al. | 204/129 |
| 4,057,379 | 11/1977 | Campbell | 204/266 X |
| 4,118,294 | 10/1978 | Pellegri | 204/291 X |

Primary Examiner—John H. Mack
Assistant Examiner—D. R. Valentine
Attorney, Agent, or Firm—Hammond & Littell, Weissenberger and Muserlian

[57] ABSTRACT

An improved bipolar separator for electrochemical cells comprising a molded aggregate of an electrically conductive powdered material and a powdered thermosetting resin in a weight ratio of 1:1 to 9:1 and having a resistivity coefficient, in the direction perpendicular to the major surfaces of the separator, of less than 0.3Ω cm and having the entire surface exposed to the anolyte, except the area of electrical contact with the anode, coated with a layer of a chemically resistant and electrically non-conductive thermosetting resin and electrochemical cells containing the said bipolar separator and method of producing the said bipolar separator.

10 Claims, 4 Drawing Figures

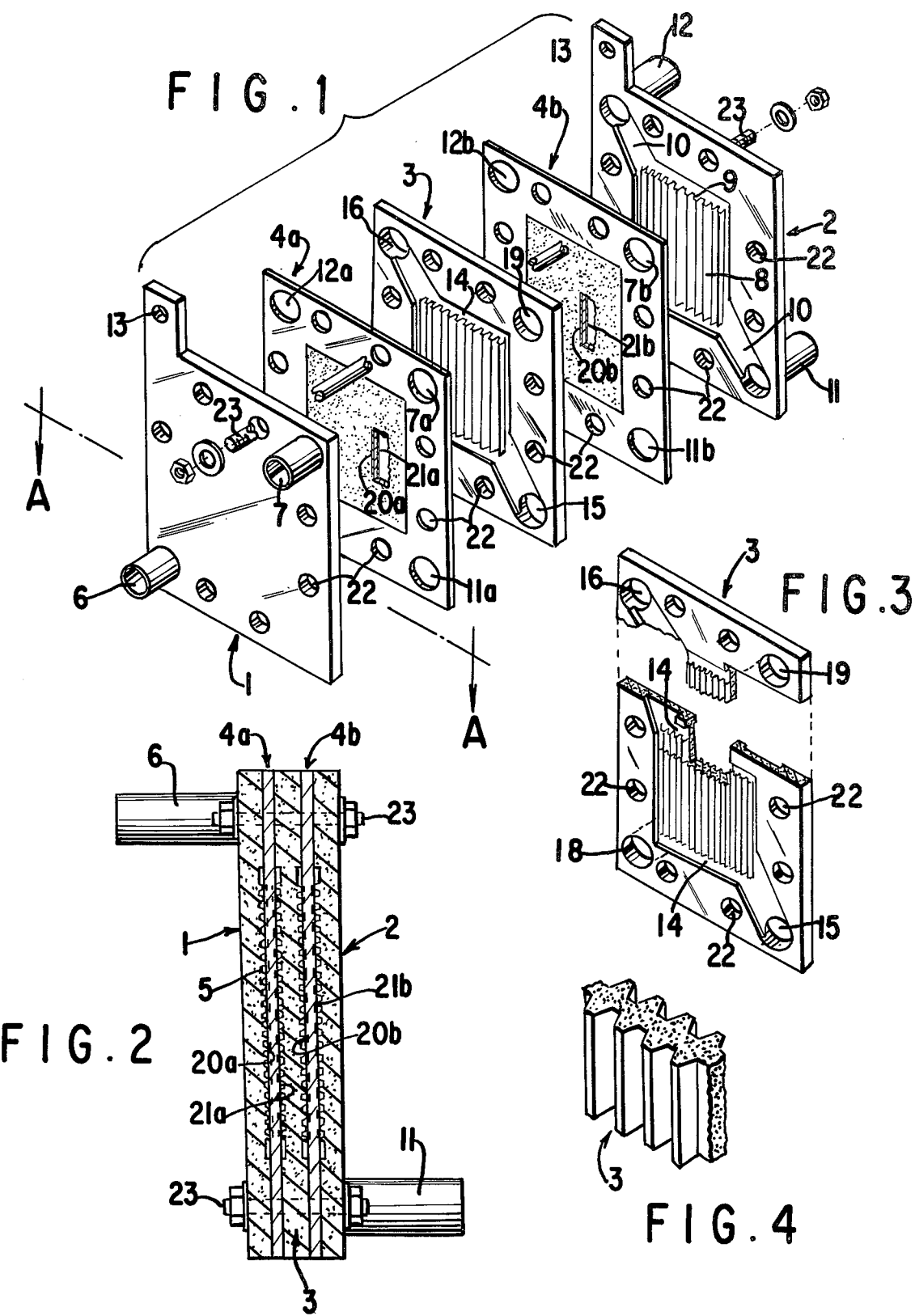

BIPOLAR SEPARATOR FOR ELECTROCHEMICAL CELLS AND METHOD OF PREPARATION THEREOF

STATE OF THE ART

Electrochemical cells are used as electrochemical current generators such as primary or secondary batteries as well as electrolytic cells. Recently, electrochemical devices having a solid electrolyte have been proposed particularly to be used as fuel cells. Typical examples of solid electrolyte cells are described in U.S. Pat. Nos. 3,134,696 and 4,039,409. Typically, said devices comprise essentially a solid electrolyte made of a thin sheet of an ion exchange resin, and on both surfaces thereof powder catalysts are applied and incorporated into the resin and constitute the dispersed electrodes of the cell. Metallic meshes or grids or drawn thin plates are assembled in electrical contact with the dispersed electrodes to supply and uniformly distribute the electric current to the dispersed electrodes.

The contact grids may be directly connected outside the cell to the electrical source or to the electrical load of the battery, respectively, in the case the device is utilized as an electrolysis cell or as an electrochemical current generator. Otherwise, the contact grids are assembled in electrical contact with the respective terminal plates constituting the housing of the cell, which terminal plates are electrically connected to the electrical source or to the electrical load. In the case of bipolar devices such as those described in U.S. Pat. No. 3,134,696, the intermediate grids, made of drawn thin plates having projections over both sides, are in contact on one side with the dispersed cathode of one cell and on the other side are in contact with the dispersed anode of the adjacent cell to constitute the bipolar separator between one cell and the adjacent cell in the series.

The reactants and the compounds which are formed in the cell are respectively introduced and collected in the empty spaces between the network of the metallic mesh making up the contact grids or in the space defined between the various points of drawing in the case that the contact grids are made of drawn thin plate. Inlets and outlets for the reactants and for the products formed are provided in the cell frames. In the said cell, the bipolar separator must provide a good electrical contact at multiple points with the dispersed electrode incorporated in the membranes or solid electrolyte as well as a circulation space for the reactant, which must uniformly contact the entire exposed surface of the dispersed electrode, and for the ready evacuation of the reaction products. The material used for the bipolar separator should be chemically inert to two types of extremely different environments. For example, in the electrolysis of aqueous solutions of sodium chloride on the cathodic side, it is exposed to a strongly alkaline environment (50% caustic soda and above) and, on the anodic side, it is exposed to wet chlorine. The material of which the bipolar separator is made must also be resistant to hydrogen and under such conditions, the bipolar separator must be a good electrical conductor and it must provide a good electrical contact with the dispersed electrodes incorporated in the membrane or solid electrolyte.

Valve metals such as titanium, tantalum, niobium, zirconium, hafnium and alloys thereof have been used for the separators. At least the surface of contact with the dispersed electrodes must be provided with a coating of non-passivable material such as the platinum group metals, since otherwise the protective oxide layer which is generated on the surface of the valve metal would impede the flow of the electric current.

Although the valve metals have excellent corrosion resistance properties, they have several shortcomings. They are highly susceptible to the absorption of atomic hydrogen which gives rise to valve metal hydrides which weakens the metal making it brittle. Moreover, when they are used in the form of drawn plates, they require the use of spacers and gaskets for adapting their respective distance to the thickness of the membrane incorporating the electrodes. The drawing process for generating in the valve metal plate projections over both sides, which constitute the electric contacts with the dispersed electrodes, has technical limitations which do not permit very high densities of contacts which would be desirable together with an optimized hydrodynamic design to favor the circulation of the reactants and the rapid evacuation of gases which are formed by the electrochemical reactions.

The use of electrically conductive plastic separators has been suggested. However, although the plastic used is chemically resistant to both the acid and alkaline environments existing in the cells, the anodic side of the conductive plastic separators has been plagued with problems arising from the electrochemical instability of the conductive plastic which is readily attached by discharging anionic species such as the halogens.

OBJECTS OF THE INVENTION

It is an object of the invention to provide novel bipolar separators which are substantially impermeable to the diffusion of atomic hydrogen, are perfectly rigid and practically inert to both the alkali and acids and are substantially protected from undue discharge of anionic species thereon.

It is another object of the invention to provide a novel method of preparing the said electrically conductive bipolar separators.

It is a further object of the invention to provide a novel electrochemical cell having the novel bipolar separators of the invention.

These and other objects and advantages of the invention will become obvious from the following detailed description.

THE INVENTION

The novel bipolar separator of the invention for electrochemical cells is comprised of a molded aggregate of an electrically conductive powdered material and a powdered thermosetting resin in a weight ratio of 1:1 to 9:1 and having a resistivity coefficient, in the direction perpendicular to the major surfaces of the separator, of less than $0.3\Omega$ cm and having the entire surface exposed to the anolyte, except the area of electrical contact with the anode, coated with a layer of a chemically resistant and electrically non-conductive thermosetting resin.

Moreover, it is possible to manufacture the bipolar separators by a molding process within strict tolerances and to optimize both the hydraulic performance and the density and size of the projections constituting the electrical contacts within extremely ample limits of choice. The bipolar separator of the instant invention is preferable made of a pressure molded and cured aggregate of carbon, graphite and/or metallic powder and of a thermosetting resin in a weight ratio of between 1:1 and 9:1, has a coefficient of resistivity in the direction perpendicular to the major surfaces of the separator less than 0.3Ω cm and has the whole surface exposed to the anolyte, with the exception of the areas of electrical contact with the anode, coated with a layer of chemically resistant and electrically insulating resin.

According to the method of the invention, the bipolar separator is made by pressure molding conveniently providing for generating the recessed surfaces, the projections for the electrical contacts, the grooves and the holes for the circulation of the reagents and the recovery of the products of reaction and the holes for the passage of assembly tie-rods in a single operation of manufacture.

The ohmic drop across the bipolar separator of the invention is extremely low in comparison with the order of magnitude of the bulk electrical resistivity coefficient which is normally found in commercial formulations of conductive cements. According to the method of the instant invention, bipolar separators have been obtained with an aggregate of graphite powder and resin in a weight ratio of 3:1 having thicknesses comprised between 3 and 5 mm, which show an ohmic drop of 5 to 32 mV at an apparent current density of 10,000 A/m$^2$.

This is made possible by inducing, during the forming process, a definite anysotropy in the material which, after molding, becomes exceptionally electrically conductive in the direction perpendicular to the major surfaces of the separator, and relatively poorly electrically conductive along planes parallel to the major surfaces. Again, with an aggregate of graphite powder and resin in a ratio of 3:1, a coefficient of resistivity of about 0.01 to 0.3 xcm in the direction perpendicular to the major surfaces and of about 50 to 5000Ω xcm along planes parallel to the major surfaces have been obtained. Therefore, such good electrical conductivity, in the direction of the electrical current flow during the operation, compatible with an aggregate having exceptional hardness, mechanical resistance and good dimensional stability up to 150°–180° C. is obtained.

The method of preparation of the bipolar separator of the invention comprises amalgamating graphite and/or metal particles having a grain size of preferably between 150 and 350 mesh with a thermosetting resin preferably in liquid form in a weight ratio between 1:1 and 9:1. The mixture may be just compactable and may have a rather friable consistency. The mixture is then transferred into a mold provided with an anti-adhesive coating such as teflon or other suitable material and is initially pressed at least at 0.5 kg/cm$^2$ and preferably about 4 kg/cm$^2$, while providing for a definite plastic flow of material along planes parallel to the major surfaces of the mold.

Under these forming conditions, an anysotropy is induced into the material and a greater density of "electric paths" is obtained which can be imagined as chains of conductive graphite or metal particles contacting each other, in a direction perpendicular to the major surfaces of the molded article with respect to the density of "electric paths" along planes parallel to the major surfaces. Therefore, a maximum conductivity in the useful direction corresponding to the direction of the current flow across the bipolar separator during operation is achieved.

The molded separator is cured, preferably at a temperature between 60° and 140° C. while maintaining the material under the molding pressure for the time necessary for substantial hardening of the thermosetting resin. After cooling, at least the anodic side of the separator, but preferably both sides thereof are provided with a coating, about 30 to 500 μm thick, of unloaded chemically resistant thermosetting resin. This may be conveniently done utilizing the same mold, or a similar mold, by first applying, over the mold and/or the separator surfaces a sufficient amount of resin, preferably in liquid form, and then closing the mold again over the cured separator and curing the resin coating under a small pressure for the time necessary to obtain complete hardening of the resin.

Finally, the areas of contact, at the vertex of the projections on both sides of the separator are conveniently buffed with a fine abrasive, or machined in order to remove the insulating sheath of unloaded resin and to expose the electrically conductive aggregate. By appropriate design of the mold, the machined surface at the vertex of the projection is made co-planar or substantially so, with the peripheral mating surfaces of the separator for a gasketless assembly. That is, the mating peripheral surfaces of the separators are pressed against the solid polymer electrolyte membrane and provide for the hydraulic sealing of the cells without the use of any gasket. The layer of unloaded resin makes the covered surfaces of the separator electrically insulating with respect to the ionic species, therefore preventing those portions of the surface of the separator from operating as an anode which causes a rapid failure because of the discharge of anions such as halogen ions on the surface of the conductive aggregate.

According to a preferred embodiment of the invention, the areas of electrical contact with the electrodes are covered with a thin layer, 1 to 5 μm thick or more, of a platinum group metal such as platinum, iridium, and rhodium applied galvanically by traditional coating techniques. This layer of non-passivable noble metal improves the electrical contact between the electrodes and the separator and protects the aggregate from accidental discharge of anions over these contact surfaces. When chloride ions are discharged at the anode, it is preferable to coat the contact area with a layer of iridium or iridium alloys such as iridium-rthenium alloys.

Examples of the thermosetting resins which can be used both for the aggregate separator as well as for the insulating coating thereof are polyesters, phenolics, furanic and epoxide resins. Two-component resins of the epoxy or modified epoxy base with aromatic amines additives as hardeners are exceptionally suitable for the objects of the invention. In particular, epoxy base resins confer excellent mechanical properties to the aggregate and permit higher loadings of conductive powders as compared to other types of thermosetting resins.

For instance, the load of graphite powder can be increased up to 90% by weight, thus providing for a very good electrical conductivity of the aggregate, and still obtain cured separators with excellent mechanical properties, especially with respect to the impact resistance and to flexure resistance. Moreover, the choice of aromatic amines as the hardener improves the acid resistance of the resin and its resistance to high temperatures. Separators prepared by the method of the invention were not dimensionally deformed after remaining for 2 hours at 150° C.

Metal powders may be used, but graphite or carbon powder are preferably used for loading the thermosetting resin. The bipolar separator of the invention and the method of its preparation are described in more detail in the following figures and specific examples which relate to a solid electrolyte cell utilized for the electrolysis of aqueous solutions of sodium-chloride embodying the bipolar separator of the invention.

Referring now to the drawings:

FIG. No. 1 is a schematic perspective exploded view showing a typical solid electrolyte cell embodying a bipolar separator of the invention.

FIG. No. 2 is a horizontal cross-section of the assembled cell along the line A—A of FIG. 1.

FIG. No. 3 is a perspective cross-sectional view of the bipolar separator of FIG. 1.

FIG. No. 4 shows an enlarged cross-sectional view of the bipolar separator of FIG. 3.

With reference to the FIGS. 1,2,3 and 4 wherein the same parts of the cell are identified with the same number, the cell comprises an anodic end plate 1, a cathodic end plate 2, a bipolar separator 3 and two membranes 4a and 4b onto whose surfaces dispersed electrodes have been incorporated. Therefore, the cell is comprised of two cell units in series and it is understood that any number of cell units can be included between the two end plates by inserting a certain number of bipolar separators and membranes incorporating the electrodes in succession between the two end plates.

Preferably, the two end plates 1 and 2 are made of the same material as the bipolar separator 3 and as the latter these are also preferably pressure molded. The anodic end plate 1 is provided on its internal surface with a grooved central zone whose grooves 5 are hydraulically connected to the anolyte inlet 6 and to the anolyte outlet 7. Similarly, the cathodic end plate 2 is provided over the internal surface thereof with a grooved central zone 8 whose grooves 9 are hydraulically connected, by connecting grooves 10 to the outlets 11 and 12.

Both end plates are provided with electrical connection means 13 to the respective poles of the electric source. The bipolar separator is provided on both major surfaces thereof with a grooved central zone, whose grooves 14 on the cathodic side of the bipolar separator are connected to holes 15 and 16 respectively co-axial to the inlet 6 and outlet 7 of the anolyte in the anodic end plate. The bipolar separator is comprised essentially by a coated aggregate of graphite powder and of a thermosetting resin made according to the invention.

The membrane 4a of the first unit cell is comprised of a sheet of cationic ion-exchange resin over central zone in which, corresponding to the area of the grooved central zone of the anodic end plate 1, powder of a catalytic material for the discharge of chloride ions has been incorporated. The incorporated powder constitutes the dispersed cathode 21 a of the first unit cell. Similarly, the membrane 4b of the second unit cell is comprised of a sheet of cationic ion-exchange resin, both sides of which, and in a central zone corresponding to the grooved area of the anodic side of the bipolar separator 3 and of the cathodic end plate 2 have been respectively incorporated the dispersed anode 20b and the dispersed cathode 21b. Materials which can be used for the dispersed anodes 20a and 20b are powders of graphite, noble metals such as platinum, ruthenium, rhodium, palladium, iridium, osmium or alloys thereof as well as oxides of the above mentioned noble metals and oxides of tin, lead, antimony, bismuth and manganese. Materials which can be used for the dispersed cathodes 21a and 21b are powders of graphite, noble metals such as platinum, ruthenium, rhodium, palladium, iridium, osmium or alloys thereof, of iron, cobalt, nickel, copper, silver and gold.

The membranes 4a and 4b are provided with four holes, respectively, (6a), 7a, 11a and 12a and (6b), 7b, 11b and 12b co-axial with the outlets 6 and 7 and 11 and 12, respectively, on the anodic end plate 1 and on the cathodic end plate 2. Holes (6a) and (6b) are not visible in the figures, but they are co-axial to inlet 6 of the anodic end plate 1 and to hole 18 (FIG. 3) of the bipolar separator. End plates 1 and 2 as well as membranes 4a and 4b and the bipolar separator 3 are provided with a series of holes 22 for the passage of assembling tie-rods 23 which may be of an insulating material such as teflon, nylon, etc. or of a mesh. In the latter case, it is necessary to provide for an insulating sleeve of a plastic material and for insulating washers and nuts to maintain the electrical insulation between the two end plates and the bipolar separator.

When the cell is assembled as shown in FIG. 2, the peripheral surfaces of the two end plates 1 and 2 and the bipolar separator 3 make a hydraulic seal against the peripheral surfaces of membranes of 4a and 4b. The projection provided within the grooved central zone of the anodic end plate contact the dispersed anode 20a incorporated in the membrane 4a and the projections within the grooved central zone on the cathodic side of the bipolar separator 3 contact the dispersed cathode 21a incorporated in the membrane 4a while the projections on the anodic side of the bipolar separator 3 contact the dispersed anode 20b and those of the cathodic end plate 2 contact the cathode 21b. In this way, the succession of unit cells is established and the number of cell units can be increased at will.

During operation, the electrolyte is introduced into the cell through inlet 6 of the anodic end plate and the electrolyte is distributed into the first anodic compartment defined by the grooves in the central zone of the internal surface of the anodic end plate 1 and through the hole 6a in the membrane 4a and through the hole 18 in the bipolar separator 3, into the second anodic compartment defined by the grooves in the central zone of the anodic side of the bipolar separator 3. The electrolyte, together with the products of the anodic reaction, is discharged through outlet 7 which, by hole 7a in membrane 4a and hole 19 in the bipolar separator 3, is in communication with the second anodic compartment. Similarly, the products which form at the cathode collect into the two cathodic compartments and are recovered through outlets 13 and 11 in cathodic end plate 2.

When the cell illustrated is used for the electrolysis of aqueous solutions of sodium chloride, chlorine is evolved at the anodes 20a and 20b and is carried along with the flow of the electrolyte along the grooves, and through holes 19 and 7a and is recovered from the cell through outlet 7 together with the spent electrolyte.

Solvated sodium ions migrate through the membranes 4a and 4b and at the cathodes 21a and 21b, hydrogen is evolved together with the formation of sodium hydroxide. Hydrogen formed in the first unit cell flows through holes 16 and 12b and, together with the hydrogen formed in the second unit cell, is recovered through outlet 12. The sodium hydroxide solution flows through holes 15 and 11b and, together with the sodium hydroxide formed in the second cell, is recovered through outlet 11. In case the type of membrane used does not allow a sufficient transfer of solvation water together with the transfer of cations, water may be circulated through the cathodic compartments through inlet 11 and outlet 12. Therefore, water reacts and dilutes the hydroxide formed and carries along its path, the hydrogen gas in the form of minute bubbles.

In the following examples there are described several preferred embodiments to illustrate the invention. However, it is to be understood that the invention is not intended to be limited to the specific embodiments.

EXAMPLE 1

100 Parts of XG 7, an epoxy type resin, and 52 parts of XG 8, an aromatic amine hardener, both manufactured by Ciba-Geigy were thoroughly mixed and graphite powder having a granulometry comprised between 150 and 400 mesh were added to the mixture in a weight ratio of the two-component resin and graphite of 3:7. The mixture was thoroughly homogenized in a mixer and the mixture was poured into a teflon mold made in the shape of the bipolar separator 3 illustrated in more detail in FIG. 3. The mixture was pressed in a way so as to provoke a substantial plastic flow oriented along planes parallel to the major surfaces of the bipolar separator which was achieved by providing for expulsion of any excess mixture from the mold through radial holes co-planar with the major surface of the mold.

The thickness of the separator was 5 mm and the depth of the grooves was 2 mm with respect to the flat surface. The mold was held in an oven at 100° C. for 8 hours while maintaining the forming pressure on the mold.

After cooling and extracting the bipolar separator from the mold, the molded separator was coated, by brushing, with an unloaded resin mixture of XG 7 (100 parts) and XG 8 (52 parts) to which a commercial tixotropic additive ($SiO_2$) had been added to reduce the surface tension of the resin mixture thereby facilitating even application of the coating over the entire surface of the bipolar separator. The coated separator was then cured in an oven at 100° C. for 5 hours and the thickness of the hardened resin coating was about 200 μm.

The contact surfaces, that is the vertexes of the projections in the recessed central zone over both sides of the bipolar separator, indicated by the numeral 26 in FIG. 4, were treated with an abrasive to remove the coating layer of unloaded (non-conductive) resin which had been applied over the whole surface of the bipolar separator as described in the preceeding paragraph. The exposed contact surfaces 26 (FIG. 4) were then coated with a galvanically deposited layer of platinum iridium alloy having a thickness of about 1 μm.

Also the two end plates 1 and 2 of the cell described in FIGS. 1 and 2 were prepared by the procedure described for the preparation of the bipolar separator 3. The ion-exchange membranes or solid electrolyte 4a and 4b were of the cationic type and comprised a sheet of a sulfonated copolymer of acrylic acid and styrene cross-linked with divinylbenzene and dispersed anodes and cathodes of platinum black were incorporated on to the surfaces of the membranes by pressing. The amount of platinum black was about 0.010 gr/cm².

The cell was satisfactorily used for the electrolysis of aqueous solution of sodium chloride to form chlorine with the operating conditions reported in Table I.

TABLE I

| - Electrolyte | NaCl at 295 g/l |
| --- | --- |
| - Temperature | 60° C. |
| - Current density | 10.000 A/m² |
| - Unit Cell Voltage | 2.98 V |
| - Current Efficiency | 96% |

Various modifications of the separator, cell and method of the invention may be made without departing from the spirit or scope thereof and it should be understood that the invention is to be limited only as defined in the appended claims. For example, while the described cell is provided with dispersed electrodes directly incorporated into the membrane (or solid electrolyte), it is understood that the bipolar separator of the invention may be utilized in bipolar cells wherein the electrodes are not physically incorporated into the membrane but they may be meshes or expanded metal structures opportunely activated to operate satisfactorily as electrodes, in which case the bipolar separator is in electrical contact with said electrodes.

We claim:

1. A bipolar separator for electrochemical cells which separates the adjacent anolyte and catholyte chambers and conducts electrical current from the anode of one cell unit to the cathode of an adjacent cell unit in a bipolar sequence of cell units comprising a molded aggregate of an electrically conductive powdered material and a thermosetting resin in a weight ratio of 1:1 to 9:1 and having a resistivity coefficient, in the direction perpendicular to the major surfaces of the separator, of less than 0.3Ω cm and having the entire surface to be exposed to the anolyte, except to the area to be in electrical contact with the anode, coated with a layer of a chemically resistant and electrically non-conductive thermosetting resin.

2. The bipolar separator of claim 1 wherein the thermosetting resin is a two-component mixture of an epoxy resin and an aromatic amine hardener.

3. The bipolar separator of claim 1 wherein the powder of electrically conductive material is graphite powder.

4. The bipolar separator of claim 1 wherein the separator is pressure formed and provided over both its major surfaces with a recessed central zone and a substantially flat peripheral zone, at least four holes within said flat peripheral zone, said four holes being hydraulically connected in pairs respectively to each of the recessed central zones on each of the major surfaces of the separator, projections within said recessed central zones on each of the major surfaces of the separator, said projections constituting the means for establishing the electrical contact between the bipolar separator and the electrodes of the cell.

5. The bipolar separator of claim 4 wherein the entire surface of the bipolar separator, with the exception of the areas for the electrical contact with the electrodes of the cell, are coated with a layer of electrically insulating thermosetting resin and the areas of electrical contact with the electrodes of the cell are coated with a layer of a non-passivable metal belonging to the platinum group.

6. In an electrochemical cell with a plurality of cell units containing an anode and an electrode and the individual cell units are separated by a bipolar separator, the improvement comprising using the separator of claim 1 as the bipolar separator.

7. The cell of claim 6 wherein the thermosetting resin is a two-component mixture of an epoxy resin and an aromatic amine hardener.

8. The cell of claim 6 wherein the powder of electrically conductive material is graphite powder.

9. The cell of claim 6 wherein the separator is pressure formed and is provided over its major surfaces with a recessed central zone and a substantially flat peripheral zone, at least four holes within said flat peripheral zone, said four holes being hydraulically connected in pairs respectively to each of the recessed central zones on each of the major surfaces of the separator, projections within said recessed central zone on each of the major surfaces of the separator, said projections constituting the means for establishing the electrical contact between the bipolar separator and the electrodes of the cell.

10. The cell of claim 6 wherein the entire surface of the bipolar separator, with the exception of the areas for the electrical contact with the electrodes of the cell, are coated with a layer of electrically insulating thermosetting resin and the areas of electrical contact with the electrodes of the cell are coated with a layer of a nonpassivable metal belonging to the platinum group.

* * * * *